United States Patent [19]

Chichlowski et al.

[11] Patent Number: 5,171,970

[45] Date of Patent: Dec. 15, 1992

[54] HEATED VACUUM MOUNTING PRESS

[75] Inventors: Wiktor S. Chichlowski, Mosley; Martin S. Harrold, Harborne, both of England

[73] Assignee: Hot Press (Heat Sealing) Limited, Birmingham, England

[21] Appl. No.: 403,735

[22] Filed: Sep. 6, 1989

[30] Foreign Application Priority Data

Sep. 9, 1988 [GB] United Kingdom ............... 8821142

[51] Int. Cl.⁵ .................................... H05B 1/00
[52] U.S. Cl. ................................. 219/243; 219/390; 100/92; 100/93 P; 156/378; 156/382
[58] Field of Search ............. 219/243, 390; 100/92, 100/93 P; 156/580, 378, 382; 432/204, 241, 253; 427/160, 168, 110, 109; 428/432

[56] References Cited

U.S. PATENT DOCUMENTS

| | | | |
|---|---|---|---|
| 3,146,692 | 9/1964 | Connolly et al. | 219/243 |
| 3,888,719 | 6/1975 | Gibbo et al. | 219/243 |
| 4,377,613 | 3/1983 | Gordon | 428/212 |
| 4,865,428 | 9/1989 | Corrigan | 350/357 |
| 4,880,698 | 11/1989 | Thomas et al. | 428/333 |
| 4,963,437 | 10/1990 | Ruf | 428/432 |
| 4,965,137 | 10/1990 | Ruf | 428/432 |
| 4,970,376 | 11/1990 | Mellor et al. | 219/543 |

Primary Examiner—Bruce A. Reynolds
Assistant Examiner—Tu Hoang
Attorney, Agent, or Firm—Iandiorio & Dingman

[57] ABSTRACT

A heated vacuum mounting press comprising an upper part which is movable between open and closed conditions, a lower part, a flexible diaphragm, an electrically conductive glass sheet member for being heated by an electric current in order to heat sheet workpiece material in the press, and an air evacuating pump for evacuating air from between the upper part and the lower part of the press when the upper part is in its closed condition on the lower part, whereby the diaphragm is able to be flexed against the sheet workpiece material to provide substantially even pressure over the surface of the sheet workpiece material while heat is applied to the sheet workpiece material from the electrically conductive glass sheet member.

8 Claims, 2 Drawing Sheets

HEATED VACUUM MOUNTING PRESS

This invention relates to a heated vacuum mounting press.

Heated vacuum mounting presses are known. They usually comprise an upper part and a lower part, with the upper part being movable between open and closed positions. Workpiece sheet material placed inside the presses will usually be such that layers of separate material become stuck together under pressure and heat, for example as in dry mounting, heat sealing or canvas bonding.

It is an aim of the present invention to provide an improved heated vacuum mounting press.

Accordingly, this invention provides a heated vacuum mounting press comprising an upper part which is movable between open and closed conditions, a lower part, a flexible diaphragm, an electrically conductive glass sheet member having an electrically conductive coating on its surface for enabling the electrically conductive glass sheet member to be heated by an electric current in order to apply heat to sheet workpiece material in the press, and air evacuating means for evacuating air from between the upper part and the lower part of the press when the upper part is in its closed condition on the lower part, whereby the diaphragm is able to be flexed against the sheet workpiece material to provide substantially even pressure over the surface of the sheet workpiece material whilst heat is applied to the sheet workpiece material from the electrically conductive glass sheet member.

Various layers of sheet workpiece material may be assembled as appropriate and they may then be inserted into the press, for example to rest on the diaphragm. Air can then be evacuated from the press to cause the sheet workpiece material to be squeezed between the electrically conductive glass sheet member and the diaphragm. When the electrically conductive glass sheet member is heated, then the required bonding of the various layers of the sheet workpiece material can be effected. The provision of the required heat using the electrically conductive glass sheet member forms a particularly efficient way of applying heat in a uniform manner to the sheet workpiece material.

Preferably, the electrically conductive glass sheet member is an electrically conductive transparent glass sheet member. With such a transparent glass sheet member, the sheet workpiece material can be seen whilst it is in the press with the upper part in its closed condition. This can help an operator of the press to see how the sheet workpiece material is progressing during its treatment, and also to see that the sheet workpiece material remains correctly positioned in the press.

The electrically conductive coating may be a layer of an electrically conductive metal oxide. A preferred electrically conductive metal oxide is fluorine doped tin oxide.

The press may be one in which the upper part includes an upper frame, and in which the lower part includes a lower frame.

In one embodiment of the invention, the press is one in which the diaphragm is mounted on the lower part, and in which the electrically conductive glass sheet member is mounted on the upper part. In such an embodiment of the invention, the press may be used for board mounting, laminating and canvas bonding.

In anther embodiment of the invention, the press may be one in which the diaphragm is mounted on the upper part, and in which the electrically conductive glass sheet member is mounted on the lower part. In such an embodiment of the invention, the press may be used as a relining press, for example for use in the restoration of canvas or in the restoration of paper work.

The press may also be used for packaging, for example for packaging goods.

The diaphragm may be fitted to a frame by a vulcanising and hot bonding process. A vacuum bag moulding technique may be used in addition to the vulcanising and hot bonding to give a better finish.

The diaphragm is preferably made of a rubber material. Other materials may however be employed.

The press may include sealing means for effecting a seal between the upper part and the lower part. The sealing means may be a sealing strip.

The air evacuating means will usually be a vacuum pump.

The press may include aperture means in the electrically conductive glass sheet member through which the air is evacuated by the air evacuating means.

The electrically conductive glass sheet member may be protected during use by a toughened glass sheet placed above the electrically conductive glass sheet member. Thus, for example, the toughened glass sheet may be placed above the electrically conductive glass sheet member and seated in the upper part such that the toughened glass sheet is spaced apart from the electrically conductive glass sheet member. The use of the toughened glass avoids damage to the electrically conductive glass sheet member, whilst at the same time still enabling the workpiece sheet material to be seen. Furthermore, the toughened glass sheet helps to insulate electrically the electrically conductive glass sheet member for the purposes of operator safety.

An embodiment of the invention will now be described solely by way of example and with reference to the accompanying drawings in which.

Figure 1:
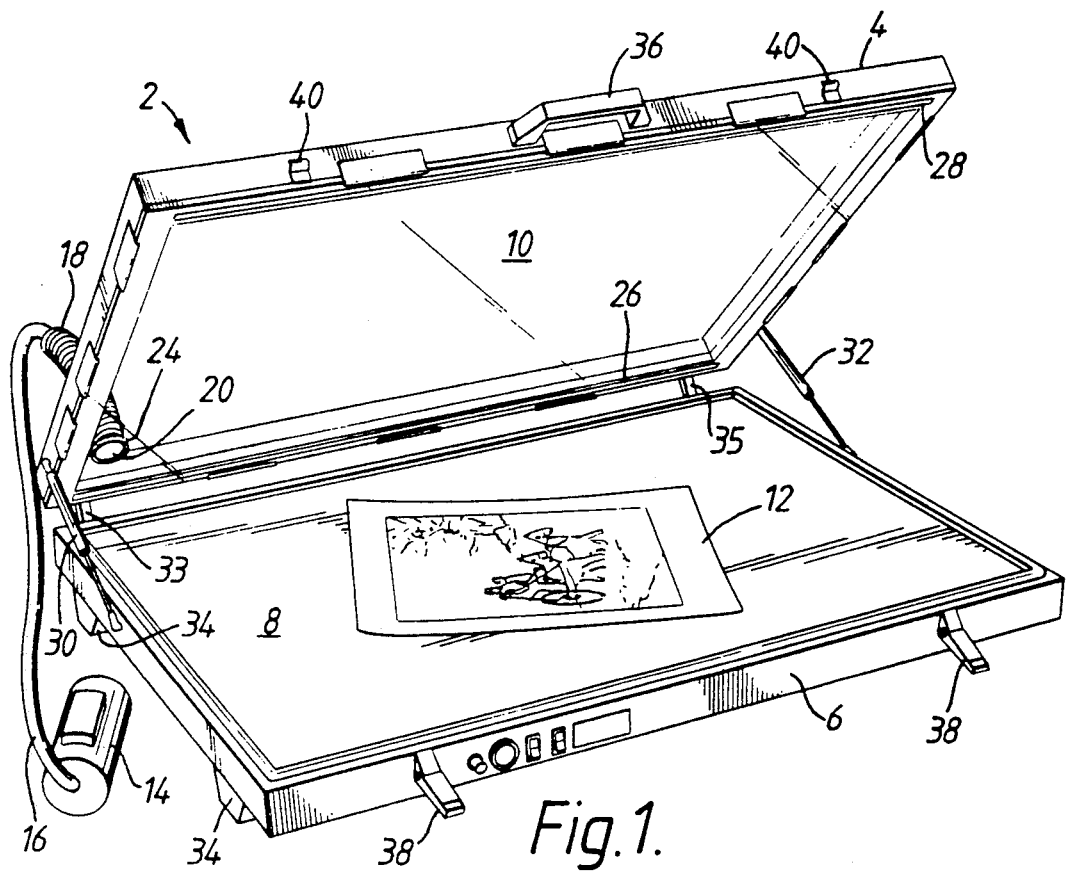
FIG. 1 is a perspective view of a heated vacuum mounting press in an open condition.
Figure 2:
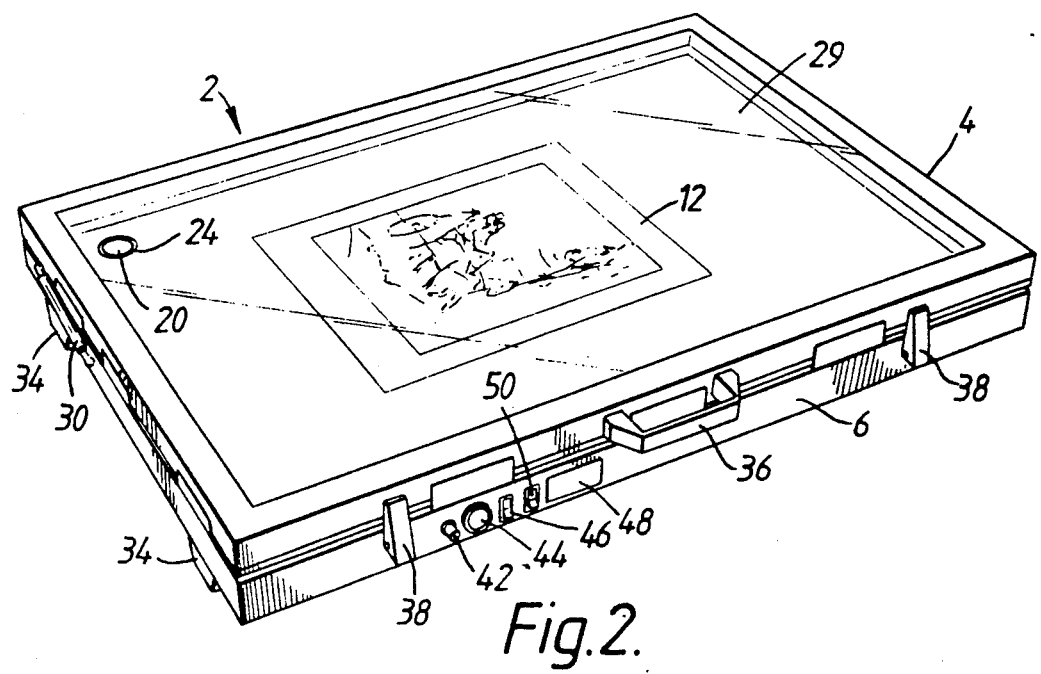
FIG. 2 is a perspective view of the heated vacuum mounting press of FIG. 1 in a closed condition.
Figure 3:
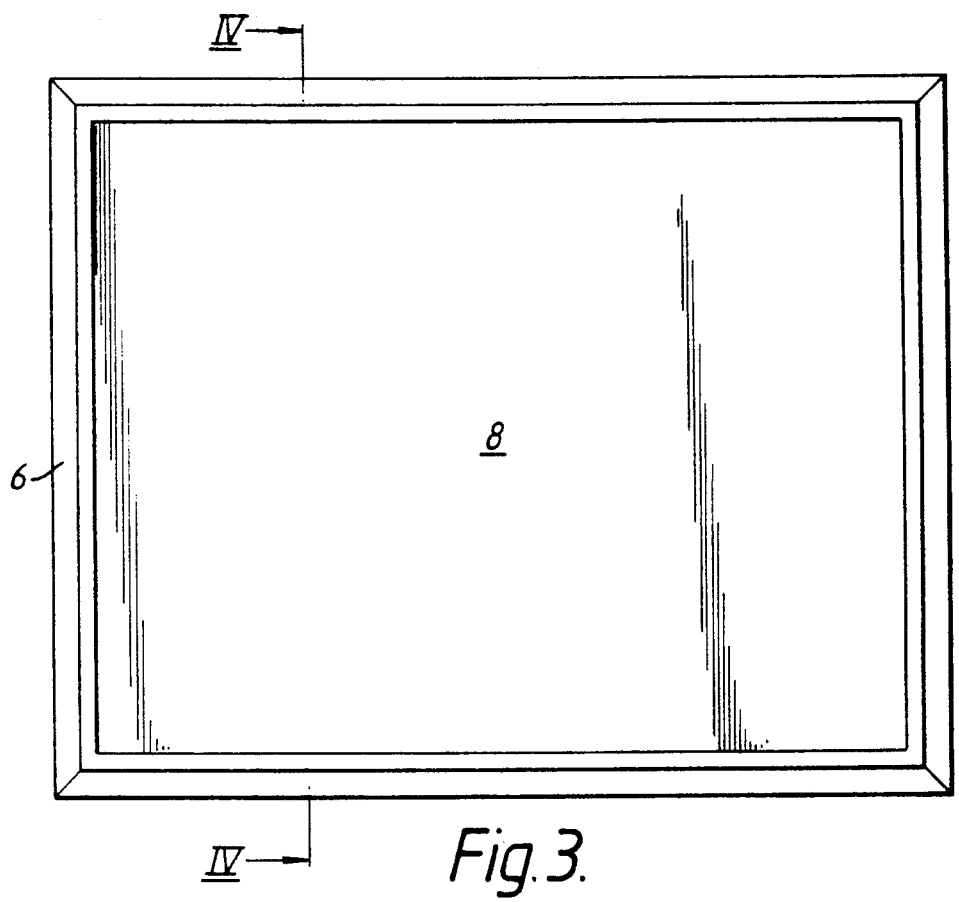
FIG. 3 shows a plan view of a diaphragm part of the heated vacuum mounting press shown in FIGS. 1 and 2.
Figure 4:
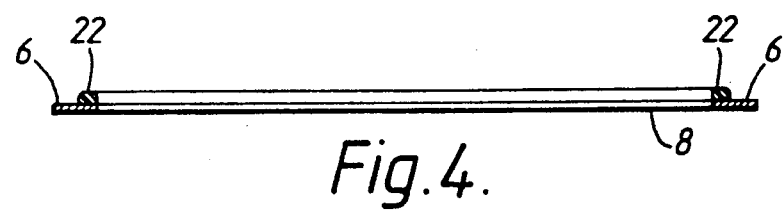
FIG. 4 is a cross section on the line IV—IV shown in FIG. 3.

Referring to the drawings, there is shown a heated vacuum mounting press 2 comprising an upper part in the form of an upper frame 4, and a lower part in the form of a lower frame 6. The upper frame 4 is movable between an open position as shown in FIG. 1 and a closed position as shown in FIG. 2. The press 2 further includes a flexible diaphragm 8 which is made of a rubber material. The diaphragm 8 is mounted on the lower frame 6. The lower frame 6 may be made of aluminium.

The press 2 further includes an electrically conductive glass sheet member 10, see FIGS. 1 and 2. The glass sheet member 10 is for being heated by an electric current in order to apply heat to sheet workpiece material 12 in the press 2. The glass sheet member 10 is a transparent glass sheet member so that the sheet workpiece material 12 in the press 2 can be seen when the upper frame 4 is in its closed condition. The glass sheet member 10 has an electrically conductive coating on one of its surfaces, the electrically conductive coating being in the form of an electrically conductive metal oxide coating. A preferred electrically conductive metal oxide coating is a fluorine doped tin oxide coating.

The press 2 further comprises air evacuating means in the form of a vacuum pump 14. The vacuum pump 14 is connected by flexible conduits 16, 18 to aperture means in the form of an aperture 20 in the glass sheet member 10. The pump 14 is thus able to evacuate air from between the upper frame 4 and the lower frame 6 of the press 2 when the upper frame 4 is closed down on to the lower frame 6. The evacuation of the air enables the diaphragm 8 to be flexed against the sheet workpiece material 12 to provide substantially even pressure over the surface of the sheet workpiece material 12 whilst heat is applied to the sheet workpiece material 12 from the glass sheet member 10. The glass sheet member 10 enables the heat uniformly to be applied to the sheet workpiece material 12.

In order to get a good evacuation of the air, the lower frame 6 is provided with sealing means in the form of a sealing strip 22.

During use, air is evacuated from the press 2 by means of the vacuum pump 14. The air is advantageously extracted via an air extraction fitting 24 which fits in the aperture 20 in the glass sheet member 10. With the air removed from the press 2, the heat and pressure from the glass sheet member 10 can be applied to the sheet workpiece material 12 as mentioned above.

The heat from the glass sheet member 10 is obtained via the electrically conductive metal layer on the surface of the glass sheet member 10. Electric current is applied to the electrically conductive metal layer by a pair of bus-bars 26, 28 as shown in FIG. 1.

In order to avoid the glass sheet member 10 becoming scratched or otherwise damaged during use, or giving an electrical shock to an operator, the glass sheet member 10 is protected by a sheet of toughened glass 29. Because this sheet of toughened glass 29 is transparent in the same way as the glass sheet member 10, it has only been shown in FIG. 2. The sheet of toughened glass 29 is seated in the upper frame 4 such that it is placed above and spaced apart from the glass sheet member 10. Because the sheet of toughened glass 29 is transparent, the sheet workpiece material 12 can still be seen. However, objects placed on top of the press 2 when it is in its closed position will not damage the glass sheet member 10 and especially its electrically conductive metal layer since the glass sheet member 10 will be protected by the sheet of toughened glass 29.

As can be seen from FIG. 1, the press 2 also comprises a pair of gas springs 30, 32 and hinges 33, 35 for supporting the upper frame 4 in an open position. The press 2, during use, stands on feet 34. When the press is not in use, the upper frame 4 can be closed by a handle 36 and locked by catches 38 which fit over clips 40.

The lower frame 6 is provided with instruments for enabling operation of the press 2. These instruments include a vacuum release valve 42, a vacuum gauge 44, and an on/off switch 46 for the vacuum gauge 44. The instruments further include a temperature display and temperature controller device 48, and an on/off switch for the temperature controller forming part of the device 48.

A press of the type 2 shown in FIG. 1 can be employed for board-mounting, laminating and canvas bonding. The press 2 is simply constructed and is easy to use by operators. In addition, the glass sheet member 10 gives uniform pressure and heating on the sheet workpiece material 12, whilst at the same time enabling the sheet workpiece material 12 to be seen.

It is to be appreciated that the embodiment of the invention as described above with reference to the accompanying drawings has been given by way of example only and that modifications may be effected. Thus, for example, the diaphragm 8 could be secured to the upper frame 4, in which case the press 2 could be used as a relining press, for example for use in the restoration of canvas or paper work. The press 2 may be made in various sizes, for example 29×36 inches (73.66×91.44 cm) or 50×40 inches (127.00×101.60 cm). The upper and lower frames 4, 6 may be made of a variety of materials. Where heavy section steel is employed, this may be welded for strength and then painted. If desired, aluminium hinges with built-in adjustment features may be employed to enable the upper frame 4 to pivot open and close with respect to the lower frame 6. Other materials and types of hinges may however be employed. The rubber material for the diaphragm 8 is preferably a nitrile material but other materials may be employed. Similarly, the sealing strip 22 is preferably made of a heat resistant silicone rubber to a profile designed to give an efficient seal, but other materials may be employed.

We claim:

1. A heated vacuum mounting press comprising an upper part which is movable between open and closed conditions, a lower part, a flexible diaphragm, a glass sheet member having a transparent electrically conductive coating on its surface, first and second elongate, spaced, electrically conductive bus bars on said electrically conductive coating and electrically connected thereto whereby an electric current is passed through said electrically conductive coating, for enabling the glass sheet member to be heated by an electric current to provide heat to sheet workpiece material in the press; and air evacuating means for evacuating air from between the upper part and the lower part of the press when the upper part is in its closed condition on the lower part, whereby the diaphragm is able to be flexed against the sheet workpiece material to provide substantially even pressure over the surface of the sheet workpiece material while heat is applied to the sheet workpiece material from the electrically conductive glass sheet member.

2. A heated vacuum mounting press according to claim 1 in which the electrically conductive coating is a layer of an electrically conductive metal oxide.

3. A heated vacuum mounting press according to claim 2 in which the electrically conductive metal oxide is fluorine doped tin oxide.

4. A heated vacuum mounting press according to claim 2 in which the diaphragm is mounted on the lower part, and in which the electrically conductive glass sheet member is mounted on the upper part.

5. A heated vacuum mounting press according to claim 2 in which the diaphragm is mounted on the upper part, and in which the electrically conductive glass sheet member is mounted on the lower part.

6. A heated vacuum mounting press according to claim 4 and including sealing means for effecting a seal between the upper part and the lower part.

7. A heated vacuum mounting press according to claim 2 in which the air evacuating means is a vacuum pump.

8. A heated vacuum mounting press according to claim 2 and including aperture means in the electrically conductive glass sheet member through which the air is evacuated by the air evacuating means.

* * * * *